United States Patent
Kava et al.

(10) Patent No.: US 11,241,968 B2
(45) Date of Patent: Feb. 8, 2022

(54) HYBRID VEHICLE AND BATTERY DEPLETION CONTROL SYSTEM FOR A HYBRID VEHICLE

(71) Applicant: FORD GLOBAL TECHNOLOGIES, LLC, Dearborn, MI (US)

(72) Inventors: Christopher Michael Kava, Livonia, MI (US); Alan Robert Dona, Huntington Woods, MI (US); Brandon R. Masterson, Dexter, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 251 days.

(21) Appl. No.: 16/582,631

(22) Filed: Sep. 25, 2019

(65) Prior Publication Data
US 2021/0086628 A1  Mar. 25, 2021

(51) Int. Cl.
*B60L 50/16* (2019.01)
*B60L 58/13* (2019.01)
*B60L 50/61* (2019.01)
*B60W 10/06* (2006.01)
*B60W 50/08* (2020.01)
*B60W 10/08* (2006.01)

(52) U.S. Cl.
CPC .............. *B60L 50/16* (2019.02); *B60L 50/61* (2019.02); *B60L 58/13* (2019.02); *B60W 10/06* (2013.01); *B60W 10/08* (2013.01); *B60W 50/082* (2013.01); *B60L 2240/423* (2013.01); *B60L 2240/443* (2013.01); *B60W 2510/244* (2013.01); *B60W 2710/083* (2013.01)

(58) Field of Classification Search
CPC .......... B60L 50/16; B60L 50/61; B60L 58/13; B60L 2240/423; B60L 2240/443; B60W 10/06; B60W 10/08; B60W 50/082; B60W 2510/244; B60W 2710/083
See application file for complete search history.

(56) References Cited

U.S. PATENT DOCUMENTS

| | | | | |
|---|---|---|---|---|
| 8,903,578 B2 * | 12/2014 | Yamazaki | ............. | B60W 20/00 701/22 |
| 2011/0166733 A1 | 7/2011 | Yu et al. | | |
| 2011/0313647 A1 * | 12/2011 | Koebler | ............. | G01C 21/3617 701/123 |

(Continued)

*Primary Examiner* — Bryan A Evans
(74) *Attorney, Agent, or Firm* — David B Kelley; Brooks Kushman P.C.

(57) ABSTRACT

A hybrid vehicle includes an engine, battery, electric machine, and controller. The engine is configured to propel the vehicle. The electric machine is configured to draw energy from the battery to propel the vehicle and to recharge the battery during regenerative braking. The controller is programmed to, in response to operation of the electric machine to propel the vehicle while the vehicle is in a nominal vehicle operation mode and depletion of a battery charge to a nominal value, terminate operation of the electric machine and propel the vehicle via the engine. The controller further is programmed to, in response to operation of the electric machine to propel the vehicle while the vehicle is in a reserve vehicle operation mode and depletion of the battery charge to a reserve value that is greater than the nominal value, terminate operation of the electric machine and propel the vehicle via the engine.

19 Claims, 2 Drawing Sheets

(56) References Cited

U.S. PATENT DOCUMENTS

| | | | |
|---|---|---|---|
| 2013/0197730 A1* | 8/2013 | Huntzicker | B60L 58/40 |
| | | | 701/22 |
| 2014/0207321 A1* | 7/2014 | King | B60L 50/61 |
| | | | 701/22 |
| 2016/0318406 A1* | 11/2016 | Healy | B60L 8/003 |
| 2018/0086227 A1* | 3/2018 | Healy | B60L 1/02 |
| 2018/0093655 A1* | 4/2018 | Healy | B60L 58/24 |
| 2018/0370520 A1* | 12/2018 | Liu | B60L 58/16 |

* cited by examiner

HYBRID VEHICLE AND BATTERY DEPLETION CONTROL SYSTEM FOR A HYBRID VEHICLE

TECHNICAL FIELD

The present disclosure relates to hybrid vehicles and control systems for hybrid vehicles.

BACKGROUND

Hybrid vehicles may include an electric machine such an electric motor/generator that is configured to draw energy from a battery to propel the vehicle and to recharge the battery during periods of regenerative braking.

SUMMARY

A hybrid vehicle includes an internal combustion engine, a battery, an electric machine, and a controller. The internal combustion engine is configured to generate power to propel the vehicle. The battery is configured to store energy. The electric machine is configured to draw energy from the battery to propel the vehicle and to recharge the battery during periods of regenerative braking. The controller is programmed to, in response to operation of the electric machine to propel the vehicle while the vehicle is in a nominal vehicle operation mode and depletion of a battery charge to a nominal value, terminate operation of the electric machine to propel the vehicle and propel the vehicle via the engine alone. The controller further is programmed to, in response to operation of the electric machine to propel the vehicle while the vehicle is in a reserve vehicle operation mode and depletion of the battery charge to a reserve value that is greater than the nominal value, terminate operation of the electric machine to propel the vehicle and propel the vehicle via the engine alone.

A hybrid vehicle includes an engine, an electric machine, a battery, and a controller. The engine and the electric machine are each configured to generate power to propel the vehicle. The battery is configured to store energy to operate the electric machine. The controller is programmed to, in response to operation of the electric machine to propel the vehicle, a cargo load being less than a first threshold, and depletion of a battery charge to a first value, terminate operation of the electric machine to propel the vehicle and propel the vehicle via the engine alone. The controller is further programmed to, in response to operation of the electric machine to propel the vehicle, the cargo load being greater than the first threshold, and depletion of the battery charge to a second value that is greater than the first value, terminate operation of the electric machine to propel the vehicle and propel the vehicle via the engine alone. The controller is further programmed to, in response to operation of the electric machine to propel the vehicle, a connection of a trailer load to the vehicle being less than a second threshold, and depletion of the battery charge to a third value, terminate operation of the electric machine to propel the vehicle and propel the vehicle via the engine alone. The controller is further programmed to, in response to operation of the electric machine to propel the vehicle, the connection of the trailer load to the vehicle exceeding the second threshold, and depletion of the battery Charge to a fourth value that is greater than the third value, terminate operation of the electric machine to propel the vehicle and propel the vehicle via the engine alone. The controller is further programmed to, in response to operation of the electric machine to propel the vehicle, the vehicle traveling on an upgrade that is less than a third threshold, and depletion of the battery charge to a fifth value, terminate operation of the electric machine to propel the vehicle and propel the vehicle via the engine alone. The controller is further programmed to, in response to operation of the electric machine to propel the vehicle, the vehicle traveling on an upgrade that is greater than the third threshold, and depletion of the battery charge to a sixth value that is greater than the fifth value, terminate operation of the electric machine to propel the vehicle and propel the vehicle via the engine alone.

A hybrid vehicle includes an engine, an electric machine, a battery, and a controller. The engine and electric machine are each configured to generate power to propel the vehicle. The battery is configured to store energy to operate the electric machine. The controller is programmed to, in response to operation of the electric machine to propel the vehicle, the vehicle traveling on an upgrade that is less than a threshold, and depletion of the battery charge to a first value, terminate operation of the electric machine to propel the vehicle and propel the vehicle via the engine alone. The controller is further programmed to, in response to operation of the electric machine to propel the vehicle, the vehicle traveling on an upgrade that is greater than the threshold, and depletion of the battery charge to a second value that is greater than the first value, terminate operation of the electric machine to propel the vehicle and propel the vehicle via the engine alone.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
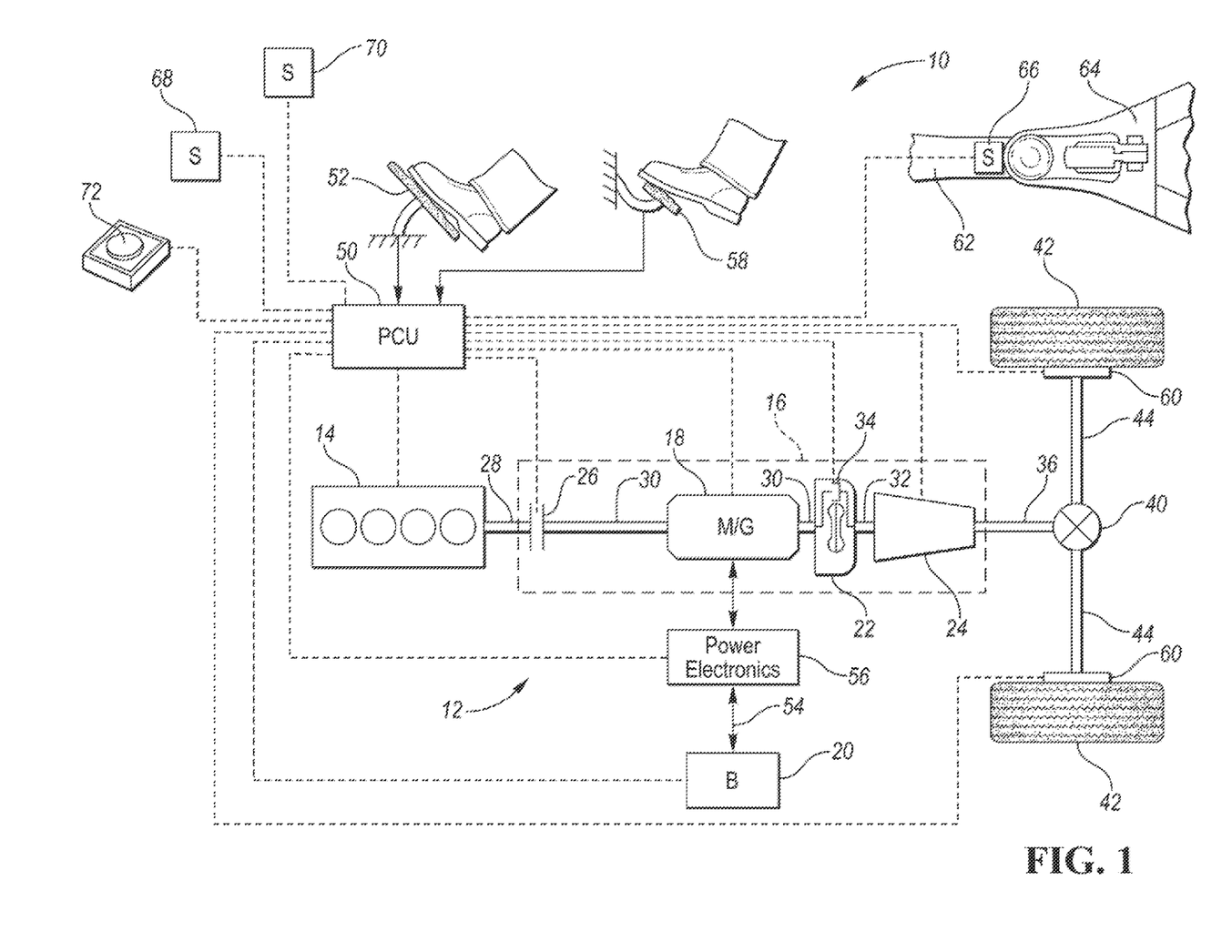
FIG. 1 is a schematic illustration of an exemplary powertrain of a hybrid vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16. As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the ermine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). Power and torque from both the engine 14 and the M/G 18 may be delivered to and received by gearbox 24. The gearbox 24 then provides powertrain output power and torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, battery 20, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), battery temperature, voltage, current, or state of charge (SOC) for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the accelerator pedal 52 generates an accelerator pedal position signal that may be interpreted by the controller 50 as a demand for increased power or decreased power, respectively. A brake pedal 58 is also used by the driver of the vehicle to provide a demanded braking torque to slow the vehicle. In general, depressing and releasing the brake pedal 58 generates a brake pedal position signal that may be interpreted by the controller 50 as a demand to decrease the vehicle speed. Based upon inputs from the accelerator pedal 52 and brake pedal 58, the controller 50 commands the torque to the engine 14, M/G 18, and friction brakes 60. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be refined to as an "electric only" or "EV" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which torque and rotational (or motive) energy or power from spinning wheels 42 is transferred back through the gearbox 24, torque converter 22, (and/or torque converter bypass clutch 34) and is converted into electrical energy for storage in the battery 20.

The HEV 10 may include a hitch 62 that is configured to connect a trailer 64 to the HEV 10. A first sensor 66, such as a force-sensing resistor, may be configured to detect the load (i.e., the force) that the trailer exerts against the HEV 10 and to communicate the load of the trailer 64 to the controller 50. A second sensor 68, such as a force-sensing resistor, may be configured to detect the weight of any cargo that has been secured to or on the HEV 10 and to communicate the weight of the cargo to the controller 50. A third sensor 70, such as an accelerometer, may be configured to detect the grade or slope of the road or surface that the HEV 10 is traveling on and to communicate the grade or slope of the road or surface that the HEV 10 is traveling on to the controller 50. The HEV 10 may also include an interface 72, such as a switch or pushbutton, that allows an operator to select a specific mode of operation of the HEV, such as a sport mode or a tow/haul mode.

It should be understood that the schematic illustrated in FIG. 1 is merely exemplary and is not intended to be limiting. Other configurations are contemplated that utilize selective engagement of both an engine and a motor to transmit through the transmission. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

It should be understood that the vehicle configuration described herein is merely exemplary and is not intended to be limited. Other electric or hybrid vehicle configurations should be construed as disclosed herein. Other vehicle configurations may include, but are not limited to, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other electric or hybrid vehicle configuration known to a person of ordinary skill in the art.

Figure 2:
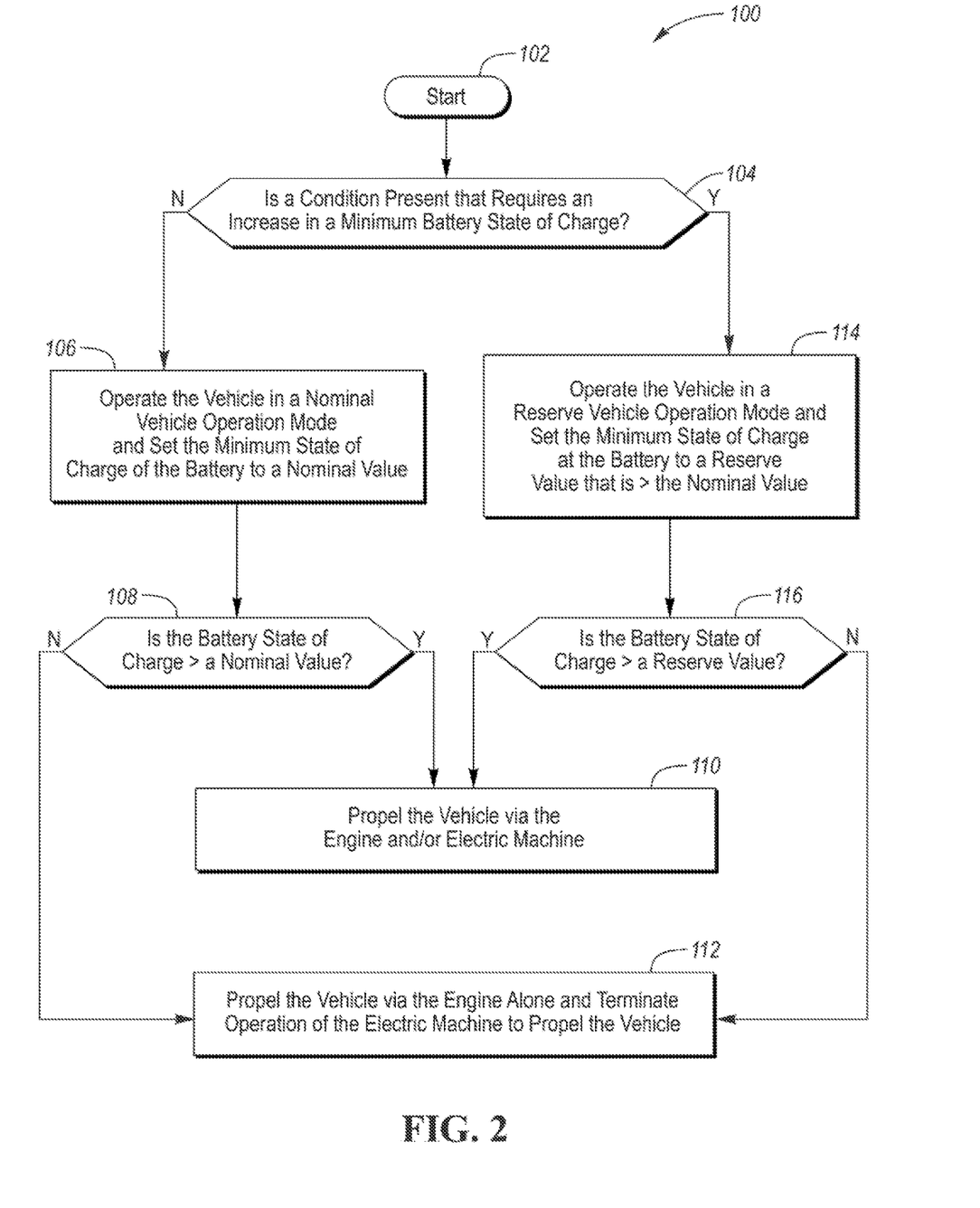
FIG. 2 is a flowchart illustrating a method of controlling the powertrain and the battery of the hybrid vehicle.

Referring to FIG. 2, a flowchart of a method 100 of controlling the powertrain 12 and the battery 20 of the hybrid vehicle 10 is illustrated. The method 100 may be stored as control logic and/or an algorithm within the controller 50. The controller 50 may implement the method 100 by controlling the various components of the HEV 10. During operation of the HEV 10, the battery 20 is configured to maintain a minimum energy reserve and/or a minimum battery state of charge. If the HEV 10 is operating in a hybrid mode where both the engine 14 and the M/G 18 are both propelling the HEV 10 or if the HEV 10 is operating in an electric only mode where only the M/G 18 is propelling the vehicle and the state of charge of the battery 20 is reduced to the minimum state of charge, the controller 50 will terminate operation of the M/G 18 to propel the HEV 10 and will command the engine 14 to propel the HEV 10 alone without the aid of the M/G 18. This may also be referred to as a charge sustaining operation. Once the state of charge of the battery 20 is reduced to the minimum state of charge and although the M/G 18 is not utilized to propel the HEV 10, the M/G 18 may be operated as a generator to recharge the battery 20.

Under certain conditions, it may be beneficial to increase the minimum state of charge of the battery 20 in order to ensure the HEV 10 is capable of meeting a performance standard or to ensure that the HEV 10 is capable of maintain a peak performance for a longer period of time. For example, it may be desirable to increase the minimum state of charge value of the state of charge of the battery 20 such that the HEV 10 is capable of meeting a performance standard or such that the HEV 10 is capable of maintaining a peak performance for a longer period time in response to loading the HEV 10 with cargo, connecting a trailer to the HEV 10, the HEV 10 traveling on an upgrade (e.g., a road or other surface that is sloped upwards), or the operator of the HEV 10 enabling a specific driving mode such as tow/haul mode or a sport mode.

In order to maintain the battery state of charge once the minimum state of charge has been increased due a condition where a larger battery reserve is desired (e.g., uphill grade, loaded, towing, special mode, etc.), the controller 50 may bias propulsion to the combustion engine 14 in lieu of utilizing the M/G 18 to propel the HEV 10, which draws energy from the battery 20. The controller 50 may also bias battery charging 50 via the engine 14 and/or battery charging via the M/G 18 through regenerative braking in order to maintain the battery state of charge once the minimum state of charge has been increased.

A specific performance standard or an example of the HEV 10 maintaining a peak performance may include increasing the minimum state of charge of the battery 20 such that the minimum state of charge of the battery 20 corresponds with a state of charge of the battery 20 required to accelerate the HEV 10 to a predetermined speed while an accelerator pedal is fully depressed or increasing the minimum state of charge of the battery 20 to correspond to a state of charge required to tow a maximum trailer load up a predetermined upgrade at a predetermined speed for a predetermined period of time. More specific examples may include increasing the minimum state of charge of the battery 20 such that the minimum state of charge of the battery 20 corresponds with a state of charge required to accelerate the vehicle from 0 to 100 miles per hour while the accelerator pedal 52 is fully depressed or may include increasing the minimum state of charge of the battery 20 to correspond with a state of charge required to tow a maximum trailer load (e.g., the maximum trailer load the vehicle is rated to pull, which may correspond to the weight of the trailer plus any cargo on the trailer) on a 6% upgrade at 100 kilometers per hour for ten minutes.

The method 1100 is initiated at start block 102. The method 100 may be initiated once the vehicle ignition has been turned on. The method 100 then moves on to block 104 where it is determined if a condition is present that requires an increase in the minimum state of charge of the battery 20. The condition at block 104 that must be present in order to increase the minimum state of charge of the battery 20 may correspond to securing a cargo load to or on the HEV 10 that exceeds a threshold (e.g., a threshold weight of the cargo), connecting a trailer to the HEV 10, connecting a trailer load to the HEV 10 that exceeds a threshold (e.g., a threshold force the trailer exerts against the HEV 10), the HEV 10 traveling on an upgrade that exceeds a threshold, or the selection of a specific mode of operation of the HEV 10, such as a sport mode or a tow/haul mode.

If a condition is not present that requires an increase in the minimum state of charge of the battery 20 at block 104, the method 100 moves on to block 106 where the HEV 10 is operated in a nominal vehicle operation mode and the minimum state of charge of the battery 20 is set to a normal, standard, or nominal value. Once in the nominal vehicle operation mode, the method 100 determines if the state of charge of the battery 20 is greater than the nominal value at block 108. If the state of charge of the battery 20 is greater than the nominal value at block 108, the method 100 moves on to block 110 where the controller 50 may command the engine 14 alone, the M/G 18 alone, or both the engine 14 and the M/G 18 to propel the HEV 10 in response to an operator depressing the accelerator pedal 52. On the other hand, if the state of charge of the battery 20 is not greater than the nominal value at block 108, the method 100 moves on to block 112 where the controller 50 will command the engine 14 alone to propel the HEV 10 and terminate any operation of the M/G 18 to propel the HEV 10 in response to an operator depressing the accelerator pedal 52.

If the method 100 has transitioned to block 110 from block 108, the operator is depressing the accelerator pedal 52 to propel the HEV 10, and the M/G 18 alone or the M/G 18 and the engine 14 are propelling the HEV 10, the method 100 may continue to monitor whether or not the state of charge of the battery 20 has depleted such that the state of charge of the battery 20 is not greater than the nominal value. If, under such a circumstance, the state of charge of the battery 20 depletes such that the slate of charge of the battery 20 is not greater than the nominal value, the method 100 will transition from block 110 to block 112 where the controller 50 will command the engine 14 alone to propel the HEV 10 and terminate operation of the M/G 18 to propel the HEV 10.

If a condition is present that requires an increase in the minim urn state of charge of the battery 20 at block 104, the method 100 moves on to block 114 where the HEV 10 is operated in a reserve vehicle operation mode and the minimum state of charge of the battery 20 is set to a reserve value that is greater than the nominal value. Once in the reserve vehicle operation mode, the method 100 determines if the state of charge of the battery 20 is greater than the reserve value at block 116. If the state of charge of the battery 20 is greater than the reserve value at block 116, the method 100 moves on to block 110 where the controller 50 may command the engine 14 alone, the M/G 18 alone, or both the engine 14 and the M/G 18 to propel the HEV 10 in response to an operator depressing the accelerator pedal 52. On the other hand, if the state of charge of the battery 20 is not greater than the reserve value at block 116, the method 100 moves on to block 112 where the controller 50 will command the engine 14 alone to propel the HEV 10 and terminate any operation of the M/G 18 to propel the HEV 10 in response to an operator depressing the accelerator pedal 52.

If the method 100 has transitioned to block 110 from block 116, the operator is depressing the accelerator pedal 52 to propel the HEV 10, and the M/G 18 alone or the M/G 18 and the engine 14 are propelling the HEV 10, the method 100 may continue to monitor whether or not the state of charge of the battery 20 has depleted such that the state of charge of the battery 20 is not greater than the reserve value. If, under such a circumstance, the state of charge of the battery 20 depletes such that the state of charge of the battery 20 is not greater than the reserve value, the method 100 will transition from block 110 to block 112 where the controller 50 will command the engine 14 alone to propel the HEV 10 and terminate operation of the M/G 18 to propel the HEV 10.

Returning to block 104, the method 100 may continually monitor whether or not the condition is present that requires an increase in a minimum state of charge of the battery 20. At block 104, the method 100 may be further configured to transition between the nominal vehicle operation mode and the reserve vehicle operation mode at block 106 and block 114, respectively, if there is any change in whether or not the condition is present that requires an increase in a minimum state of charge of the battery 20, regardless of which step the method 100 is currently implementing.

The method 100 may also be configured to operate to adjust the minimum state of charge of the battery 20 individually and for each of the conditions detailed above and according to the method 100 described in FIG. 2. For example, the method 100 may be configured to transition from a first nominal vehicle operation mode to a first reserve vehicle operation mode in response to securing a cargo load to or on the HEV 10 that exceeds a first threshold, to transition from a second nominal vehicle operation mode to a second reserve vehicle operation mode in response to connecting a trailer load to the HEV 10 that exceeds a second threshold, to transition from a third nominal vehicle operation mode to a third reserve vehicle operation mode in response to the HEV 10 traveling on an upgrade that exceeds a third threshold, or to transition from a fourth nominal vehicle operation mode to a fourth reserve vehicle operation mode in response to selecting a specific mode of operation of the HEV 10. The nominal values and the reserve values for the minimum state of charge of the battery 20 may have the same value or different values for each of the conditions detailed above (i.e., cargo load, trailer load, upgrade, specific vehicle mode, etc.) and according to the method 100 described in FIG. 2. For example, the method 100 may have a first value that operates as the nominal value and a second value that operates as the reserve value when the condition is whether or not a cargo load that is secured to or on the HEV 10 exceeds the first threshold, the method 100 may have a third value that operates as the nominal value and a fourth value that operates as the reserve value when the condition is whether or not a trailer load that is connected to the HEV 10 exceeds the second threshold, or the method 100 may have a fifth value that operates as the nominal value and a sixth value that operates as the reserve value when the condition is whether or not the HEV 10 traveling on an upgrade that exceeds a third threshold.

Each of the first, second, third, fourth, etc. nominal and reserve vehicle operation modes may operate simultaneously. Under such a circumstance where the several nominal and/or reserve vehicle operation modes may operate simultaneously, whichever mode of operation has the largest value for the minimum state of charge of the battery 20, whether it be nominal value, a reserve value, or an equivalent of a nominal or reserve value (e.g., the first, second, third, fourth, fifth, and sixth values described above), may dictate the value for the minimum state of charge of the battery 20 that will be utilized.

The method 100 may be further configured to adjust the reserve value or equivalent (i.e., second value, fourth value, or six value) based on a magnitude of the condition that triggered the method 100 to operate in the reserve vehicle operation mode. For example, if the method 100 was transitioned to the reserve vehicle operation mode in response to securing a cargo load to the HEV 10 that exceeded the first threshold, the equivalent reserve value (i.e., second value) for the minimum state of charge of the battery 20 may be increased in response to increase in the weight of the cargo load. Such increases in the equivalent reserve value based on the cargo load may be stored as a look-up table within the controller 50. The increases in the equivalent reserve value based on the cargo load may be linear, exponential, or based on testing or collected data. As another example, if the method 100 was transitioned to the reserve vehicle operation mode in response to connecting a trailer load to the HEV 10 that exceeded the second threshold, the equivalent reserve value (i.e., fourth value) for the minimum state of charge of the battery 20 may be increased in response to an increase in the force the trailer exerts against the HEV 10. Such increases in the equivalent reserve value based on the trailer load may be stored as a look-up table within the controller 50. The increases in the equivalent reserve value based on the trailer load may be linear, exponential, or based on testing or collected data. As yet another example, if the method 100 was transitioned to the reserve vehicle operation mode in response to the HEV 10 traveling on an upgrade that exceeds a third threshold, the equivalent reserve value (i.e., sixth value) for the minimum state of charge of the battery 20 may be increased in response to increase in upgrade. Such increases in the equivalent reserve value based on the upgrade may be stored as a look-up table within the controller 50. The increases in the equivalent reserve value based on the upgrade may be linear, exponential, or based on testing or collected data. If the HEV 10 is traveling over an area that has a changing upgrade which is also significant enough to require a transition to the reserve mode, the controller 50 may estimate the value of the upgrade based on a rolling average.

It should be understood that the flowchart in FIG. 2 is for illustrative purposes only and that the method 100 should not be construed as limited to the flowchart in FIG. 2. Some of the steps of the method 100 may be rearranged while others may be omitted entirely. It should be further understood that the designations of first, second, third, fourth, etc. for thresholds, nominal vehicle operation modes, reserve vehicle operation modes, nominal values, reserve value, equivalents of nominal or reserve values, or any other factor relevant to the method 100 in FIG. 2 may be rearranged in the claims so that they are in chronological order with respect to the claims.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A hybrid vehicle comprising:
    an engine and an electric machine each configured to generate power to propel the vehicle;
    a battery configured to store energy to operate the electric machine; and
    a controller programmed to,
        in response to operation of the electric machine to propel the vehicle, a cargo load being less than a first threshold, and depletion of a battery charge to a first value, terminate operation of the electric machine to propel the vehicle and propel the vehicle via the engine alone,
        in response to operation of the electric machine to propel the vehicle, the cargo load being greater than the first threshold, and depletion of the battery charge to a second value that is greater than the first value, terminate operation of the electric machine to propel the vehicle and propel the vehicle via the engine alone,
        in response to operation of the electric machine to propel the vehicle, a connection of a trailer load to the vehicle being less than a second threshold, and depletion of the battery charge to a third value, terminate operation of the electric machine to propel the vehicle and propel the vehicle via the engine alone,
        in response to operation of the electric machine to propel the vehicle, the connection of the trailer load to the vehicle that exceeding the second threshold, and depletion of the battery charge to a fourth value that is greater than the third value, terminate operation of the electric machine to propel the vehicle and propel the vehicle via the engine alone,
        in response to operation of the electric machine to propel the vehicle, the vehicle traveling on an upgrade that is less than a third threshold, and depletion of the battery charge to a fifth value, terminate operation of the electric machine to propel the vehicle and propel the vehicle via the engine alone, and
        in response to operation of the electric machine to propel the vehicle, the vehicle traveling on an upgrade that is greater than the third threshold, and depletion of the battery charge to a sixth value that is greater than the fifth value, terminate operation of the electric machine to propel the vehicle and propel the vehicle via the engine alone.

2. The hybrid vehicle of claim 1, wherein the controller is programmed to, in response to an increase in the cargo load above the first threshold, increase the second value.

3. The hybrid vehicle of claim 1, wherein the controller is programmed to, in response to an increase in the trailer load above the second threshold, increase the fourth value.

4. The hybrid vehicle of claim 1, wherein the controller is programmed to, in response to an increase in the upgrade above the third threshold, increase the sixth value.

5. A hybrid vehicle comprising:
    an engine and an electric machine each configured to generate power to propel the vehicle;
    a battery configured to store energy to operate the electric machine; and
    a controller programmed to,
        in response to operation of the electric machine to propel the vehicle, the vehicle traveling on an upgrade that is less than a threshold, and depletion of a battery charge to a first value, terminate operation of the electric machine to propel the vehicle and propel the vehicle via the engine alone, and
        in response to operation of the electric machine to propel the vehicle, the vehicle traveling on an upgrade that is greater than the threshold, and depletion of the battery charge to a second value that is greater than the first value, terminate operation of the electric machine to propel the vehicle and propel the vehicle via the engine alone.

6. The hybrid vehicle of claim 5, wherein the controller is programmed to, in response to an increase in the upgrade above the threshold, increase the second value.

7. The hybrid vehicle of claim 5, wherein the upgrade is based on rolling average.

8. The hybrid vehicle of claim 5, wherein the second value corresponds with a battery charge required to accelerate the vehicle to a predetermined speed while an accelerator pedal is fully depressed.

9. A hybrid vehicle comprising:
    an internal combustion engine configured to generate power to propel the vehicle;
    a battery configured to store energy;

an electric machine configured to draw energy from the battery to propel the vehicle and to recharge the battery during periods of regenerative braking; and a controller programmed to, in response to operation of the electric machine to propel the vehicle while the vehicle is in a nominal vehicle operation mode and depletion of a battery charge to a nominal value, terminate operation of the electric machine to propel the vehicle and propel the vehicle via the engine alone, in response to operation of the electric machine to propel the vehicle while the vehicle is in a reserve vehicle operation mode and depletion of the battery charge to a reserve value that is greater than the nominal value, terminate operation of the electric machine to propel the vehicle and propel the vehicle via the engine alone, and in response to securing a cargo load to the vehicle that exceeds a threshold, transition the vehicle from the nominal mode to the reserve mode.

10. The hybrid vehicle of claim 9 wherein the controller is programmed to, in response to an increase in the cargo load above the threshold, increase the reserve value.

11. The hybrid vehicle of claim 9, wherein the controller is programmed to, in response to connecting a trailer load to the vehicle that exceeds a threshold, transition the vehicle from the nominal mode to the reserve mode.

12. The hybrid vehicle of claim 11, wherein the controller is programmed to, in response to an increase in the trailer load above the threshold, increase the reserve value.

13. The hybrid vehicle of claim 9, wherein the controller is programmed to, in response to the vehicle traveling on an upgrade that exceeds a threshold, transition the vehicle from the nominal mode to the reserve mode.

14. The hybrid vehicle of claim 13, wherein the controller is programmed to, in response to an increase in the upgrade above the threshold, increase the reserve value.

15. The hybrid vehicle of claim 14, wherein the upgrade is based on rolling average.

16. The hybrid vehicle of claim 9, wherein the controller is programmed to, in response to selection of a sport mode, transition the vehicle from the nominal mode to the reserve mode.

17. The hybrid vehicle of claim 9, wherein the controller is programmed to, in response to selection of a tow/haul mode, transition the vehicle from the nominal mode to the reserve mode.

18. The hybrid vehicle of claim 9, wherein the reserve value corresponds with a battery charge required to accelerate the vehicle to a predetermined speed while an accelerator pedal is fully depressed.

19. The hybrid vehicle of claim 9, wherein the reserve value corresponds with a battery charge required to tow a maximum trailer load up a predetermined upgrade at a predetermined speed for a predetermined period of time.

* * * * *